United States Patent Office 3,152,093
Patented Oct. 6, 1964

3,152,093
NEUTRON ABSORBING ASPHALTIC COMPOSITION
Robert O. Boykin, Sr., Glendale, and Philip S. Osborne, Los Angeles, Calif., assignors to Osborne Associates, Los Angeles, Calif., a partnership
No Drawing. Filed Feb. 9, 1959, Ser. No. 791,823
3 Claims. (Cl. 252—478)

This invention relates to a novel asphaltic composition and its method of production. The asphaltic composition or compound of the present invention is particularly characterized by its ability to effectively absorb thermal neutrons, but has other highly desirable properties which render it useful in a wide range of applications. The asphaltic composition may be said to be further characterized by the presence of relatively large quantities of elemental boron (usually as boric oxide) homogeneously dispersed in the asphalt which constitutes the main constituent.

As at present advised, neutrons carry no net electric-charge and cannot be deflected in a magnetic or electric field and feel substantially no resistance to the penetration of a target nucleus. Neutrons will traverse thick layers of heavy elements with little loss in energy. Energetic charged particles or isotopes result from entry of the neutron into a struck nucleus, with prolonged radiation from affected nuclei. For example, cobalt 59 is stable, non-radioactive and extensively used in metals, alloys and as a pigment; the entrance of a neutron into the cobalt nucleus forms cobalt 60 which is a dangerously radioactive, long half-life isotope emitting gamma radiations. Similar dangerous forms result from the entrance of a neutron into the nucleus of many other elements such as iron, zirconium, zinc, antimony, etc. Because of the lethal effect of neutron and gamma radiation on tissue, care must be observed by workers exposed to it. The absorption of neutrons, or their conversion from fast neutrons to slow or thermal neutrons of low energy, constitutes a problem. Although cadmium absorbs thermal neutrons, this is an expensive material and therefore cannot be used extensively.

The present invention may be said to relate to a method of producing a novel asphaltic composition which is relatively inexpensive and which has remarkable physical properties. The asphaltic composition of the present invention may be used as a shielding, in the formation of radiation absorbing barriers, moderators, reactor control elements, and whenever neutron attenuation properties are desired.

Boron presents a high collision cross-section for neutrons, and the presence of even a small amount of boron in any material greatly increases the probability of a neutron-boron reaction over any other reaction with the neutron. The neutron-boron reaction results in a disintegration of the boron to lithium, with a potentially non-dangerous alpha emission; the by-products have a short half-life and are of non-radioactive nature.

The asphaltic composition may be used either alone or as an enriched binder for or component of other materials. The asphaltic composition is substantially totally soluble in many of the common organic and petroleum solvents; because of its enhanced physical properties, it is adapted for use as a water and water-proof coating, paint or paint component, mastic or calking compound. It is readily crushed and therefore may be added to other materials or to solvents. It is extremely resistant to leaching and disintegration by water and dilute aqueous alkaline solutions. It has an enhanced, high melting point. These and various other properties render the asphaltic composition of the present invention applicable to a great many uses.

Generally stated, the method of producing this novel asphaltic composition comprises heating an asphalt to fluidity, progressively adding boric acid (preferably previously combined with a small amount of sulfuric acid) to the fluid asphalt, and continuing the supply of heat during such progressive addition and thereafter until a temperature of above about 210° C. is attained and evolution of gases and vapors has substantially terminated. As a result, elemental boron in the form of boric oxide in homogeneously dispersed form is formed in situ in the mixture. This boron and boric oxide is obtained as a stable, extremely fine suspension or dispersion within the asphalt.

It is an object of the present invention, therefore, to disclose and provide a method of producing a novel asphaltic composition of enhanced physical and chemical properties.

A further object of the invention is to disclose and provide a novel method of producing an asphaltic composition containing boric oxide homogeneously dispersed therein.

A further object of the invention is to disclose and provide a method of producing a novel asphaltic composition whereby boric oxides may be formed in situ within the asphalt.

Again, an object of the invention is to disclose and provide a novel asphaltic composition capable of effectively absorbing thermal neutrons.

Another object is to disclose and provide a novel asphaltic composition containing boron in the form of boric oxide in homogeneously dispersed, virtually non-leachable form.

These and various other objects, advantages, uses, adaptations and modifications of the invention will become apparent from the description given hereinafter and examples stated.

It is to be understood that the term "asphalt" as used herein refers to and includes asphaltites such as gilsonite, asphaltic pyrobitumens such as elaterite and the pyrogenous asphalts or petroleum asphalts which are obtained from pretoleums by distillations, blowing with air at elevated temperatures, and in the refining of certain distillates with sulfuric acid. Natural asphalts, because of their high mineral content, are not preferred. The normal petroleum asphalts, particularly those having less than about 0.1% ash content, constitute a desirable, economic source.

It is to be remembered that asphalts vary in softening point, penetration, ductility, etc. The selection of the initial asphalt from which the composition of this invention is to be made will depend somewhat upon the ultimate use to which the final composition is directed. Those skilled in the art may readily select the desired starting material from the information given herein.

During the manufacture of the asphaltic composition of this invention, boric acid is used as the source of the elemental boron and boric oxide. Boric acid as used herein refers to metaboric acid, orthoboric acid or pyroboric acid since any of these may be used as the starting material. Ordinarily, however, the orthoboric acid ($H_3BO_3$) is employed. In view of the temperatures used in the process of making the composition of this invention, it may be said that transformations occur from the ortho form to the meta form and to the pyroboric acid form. The metaboric form may be reduced to an oxide as follows: $2HBO_2 = B_2O_3 \cdot H_2O$. But it is also possible that $4HBO_2 = H_2B_4O_7 + H_2O$. All of these transformations include the loss or elimination of water. By regulating the maximum temperature attained during the manufacturing process and the time at which the molten mass is maintained at such elevated temperature, it is possible to control the proportion of $B_2O_3$ formed and retain a desired amount of the metaboric form. This may be desirable if it is desired that the composition contain a proportion of added hydrogen as well as boron.

Moreover, it has been found that in order to make certain that the boric oxide or boric acid contained in the finished composition is in virtually nonleachable form, that the boric acid added to the fluid, heated asphalt be added in conjunction with a small amount of sulfuric acid. The preferred method of procedure is to add between 0.2% and 0.8% of sulfuric acid to the boric acid, by weight of such boric acid before this acidified mixture is added to the fluid asphalt. The product is deemed nonleachable when tested with sodium hydroxide one normal solution.

A typical example will illustrate the mode of procedure. One ton of asphalt having a softening point of about 68° C. is heated in a suitable vessel to a temperature of approximately 210°–220° C. To this fluid asphalt there is slowly, progressively added 700 lbs. of orthoboric acid to which there had been previously added 3.5 lbs. of sulfuric acid. The fluid mass is stirred or agitated during the addition and the agitation is continued until all of the bubbling and frothing which accompanies the elimination of gases and water vapors from the hot mass has virtually terminated. During the addition and subsequent thereto, the mass or mixture is maintained fluid by the continued addition of heat. The temperature of the mixture is increased during the addition and the supply of heat is continued until a temperature of above about 220° C. is reached and in most instances, a temperature of between about 230° C. and 250° C. is attained. The supply of heat and agitation are continued until evolution of gases and vapors has substantially terminated, such vapors have been removed and the boric oxide in homogeneously dispersed form is formed in situ in said mixture. The mass can then be transferred from the kettle into suitable containers or poured into molds where it is permitted to cool.

The asphaltic composition referred to in the above example will contain approximately 19.6% $B_2O_3$ or 6% B. It is eminently suited for use as a shielding compound, moderator or wherever neutron attenuation properties are desired. The temperature associated with the melting point of the product (using an initial asphalt of 68° C. melting point) was on the order of 177°–180° C.; when a 74° C. asphalt was used, the melting point of the product was raised to above 200° C. The rapid evolution of steam from the boric acid addition appears to cause distillation and removal of lighter fractions from the asphalt. The specific gravity of the product will vary from 1.05 to as high as 1.7, depending upon the amount of boron incorporated therein, although specific gravity of 1.1 to 1.5 represents an efficient range.

It is to be understood that the present invention is not limited to the specific portions given in the example referred to. Between about 10 lbs. and 1000 lbs. of boric acid may be added per ton of fluid asphalt. The boric acid may be added alone (where non-leaching characteristics are not essential), but ordinarily it is preferred that the boric acid be accompanied with between about 0.2% and 0.8% of sulfuric acid (sp. gr. 1.82–1.84) by weight of the boric acid. When sulfuric acid is used, it is preferred to intermix sulfuric acid with the boric acid before the latter is added to the molten asphalt. In all instances, the boric acid is preferably in granular or finely divided form. Enhancement of properties is attained when the finished asphaltic composition contains between about 1% and 25% by weight of boric oxide and/or elemental boron. As previously indicated, the time and temperatures used during the manufacture of the composition will, to some extent, effect the amount of metaboric acid left in the composition and thereby modify the composition to the extent that it will contain hydrogen in addition to the boron. In all instances, however, the temperature during and after addition of the boric acid should be elevated to about 210° C. and maintained at that level or between 210° C. and 230° C. until all evolution of gases and vapors has ceased.

Asphalts of low ash content should be employed whenever the finished composition is to be employed as a retarder of thermal neutrons. When the material is to be employed as a paint or water-proof coating, then any kind of asphalt may be used. All uses, advantages and modifications of this invention coming within the scope of the appended claims are embraced thereby.

We claim:

1. A method of producing a novel asphaltic composition capable of effectively absorbing thermal neutrons containing boric oxide in homogeneously dispersed, virtually non-leaching form, comprising: heating an asphalt to fluidity, progressively adding to said fluid asphalt with agitation boric acid until the resulting asphalt-boric oxide mixture has a boron concentration between about 1% and 25% by weight and a small amount of sulfuric acid adapted to rendering the resulting asphalt-boric oxide mixture virtually non-leachable, and continuing the supply of heat to maintain the mixture fluid and attain a temperature of above about 210° C., until evolution of gases and vapors has substantially terminated and such vapors have been removed, and boric oxide in homogeneously dispersed form is formed in situ in said mixture.

2. A method as stated in claim 1 wherein the boric acid and sulfuric acid are added as a premixture, the boric acid containing between 0.2% and 0.8% by weight of sulfuric acid.

3. A novel asphaltic composition capable of effectively absorbing thermal neutrons, consisting essentially of: an asphalt containing between about 1% and 25% of boron in the form of boric oxide homogeneously dispersed in said asphalt, said boric oxide being virtually non-leachable from said composition by water and dilute aqueous alkaline solutions, said composition being produced according to the method set forth in claim 1.

References Cited in the file of this patent

UNITED STATES PATENTS

| | | |
|---|---|---|
| 733,987 | Merrill | July 21, 1903 |
| 1,394,874 | Wilson et al. | Oct. 25, 1921 |
| 2,093,450 | Jacobsohn | Sept. 21, 1937 |
| 2,727,996 | Rockwell | Dec. 20, 1955 |
| 2,796,411 | Zirkle | June 18, 1957 |

OTHER REFERENCES

AECD–3942, "Asphalt as a Shielding Medium," by Jaske, Sept. 26, 1949, U.S. AEC Document. Available from AEC on Microcard. Pp. 1, 2, 4.

Rockwell: Reactor Shielding Design Manual, November 1956, pp. 177, 184, and 188–190, McGraw-Hill.